(12) United States Patent
Urabe et al.

(10) Patent No.: US 6,476,889 B2
(45) Date of Patent: Nov. 5, 2002

(54) DISPLAY APPARATUS, A METHOD OF MANUFACTURING THE SAME AND A COLOR FILTER

(75) Inventors: Tetsuo Urabe, Kanagawa; Nobuyuki Shigeno; Takayuki Fujioka, both of Tokyo, all of (JP)

(73) Assignee: Sony Corporation (JP)

( * ) Notice: Subject to any disclaimer, the term of this patent is extended or adjusted under 35 U.S.C. 154(b) by 70 days.

(21) Appl. No.: 09/733,953

(22) Filed: Dec. 12, 2000

(65) Prior Publication Data
US 2001/0004276 A1 Jun. 21, 2001

(30) Foreign Application Priority Data
Dec. 13, 1999 (JP) ............................................ 11-353217

(51) Int. Cl.<sup>7</sup> ............................................ G02F 1/1336
(52) U.S. Cl. ........................................ 349/106; 349/113
(58) Field of Search .................................. 349/113, 106

(56) References Cited

U.S. PATENT DOCUMENTS 6,215,538 B1 * 4/2001 Narutaki et al. ............ 349/113
6,259,500 B1 * 7/2001 Kijima et al. ............... 349/113

FOREIGN PATENT DOCUMENTS

| JP | 11-052366 | 2/1999 |
|---|---|---|
| JP | 11-183892 | 7/1999 |

* cited by examiner

*Primary Examiner*—James Dudek
(74) *Attorney, Agent, or Firm*—Rader, Fishman & Grauer PLLC; Ronald P. Kananen, Esq.

(57) ABSTRACT

A hybrid type display apparatus capable of maintaining color purity in a case of transmission mode display, and improving lightness of color in a case of reflection mode display is provided. This hybrid type display apparatus is comprised of: a pair of substrates comprising a first substrate on a front side and a second substrate on a rear side, disposed in opposite directions spaced apart from each other; a first electrode provided on an internal surface of the first substrate; a second electrode provided on an internal surface of the second substrate; a color filter provided on the first substrate, aligned with a pixel in a portion between the first electrode and the second electrode spaced apart in the opposite directions from each other; a liquid crystal layer interposed between the first and the second substrates; and a reflection layer provided on the second substrate. The reflection layer has a hole provided for each pixel, which divides a plane of each pixel into a transmission portion within the hole and a reflection portion outside the hole. The color filter comprises a lamination of a colored layer and a transparent layer. The colored layer is formed thinner in the reflection portion than in the transmission layer, and the transparent layer is formed to cover a difference in level between the transmission portion and the reflection portion.

16 Claims, 5 Drawing Sheets

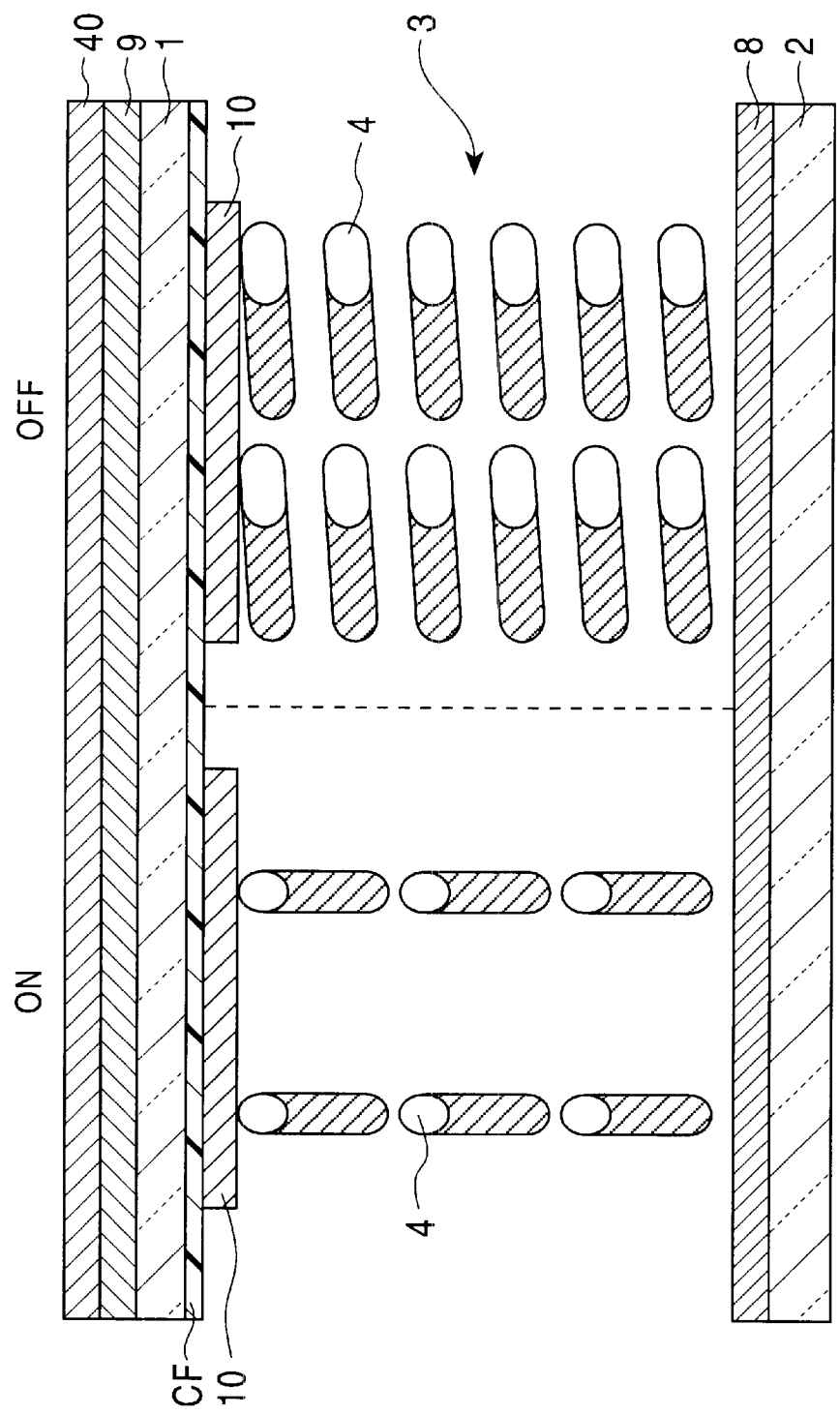

T : TRANSMISSION PART

R : REFLECTION PART

US 6,476,889 B2

DISPLAY APPARATUS, A METHOD OF MANUFACTURING THE SAME AND A COLOR FILTER

BACKGROUND OF THE INVENTION

1. Field of the Invention

The present invention relates to a so-called hybrid-type display apparatus (hereinafter referred to as a semi-transmission reflection layer) provided with a reflection layer having a hole in part on its rear side (hereinafter referred to as a semi-transmission reflection layer).

2. Description of the Related Art

A hybrid-type display apparatus is disclosed, for example, in Japanese Patent Application Publication Laid Open Nos. 11-052366 and 11-183892. In a hybrid-type liquid crystal display apparatus, when there is external light (natural rays of light, indoor illumination or the like) that ensures a sufficient brightness can be obtained, it performs a transmission-mode display that utilizes the external light by reflecting its external incident light entering from a front side on a semi-transmission reflection layer on the rear side; and, when any external light ensuring a sufficient brightness is not obtainable, it performs a transmission-mode display that utilizes rays of light from a back-light disposed on the rear side of the liquid crystal display apparatus. This hybrid-type liquid crystal display apparatus is comprised of: a pair of substrates disposed in opposite directions on the front and rear sides; an electrode provided on an internal surface of one of the pair of substrates; an electrode provided on an internal surface of the other one of the pair of substrates; a liquid crystal layer interposed between said pair of the substrates; and a semi-transmission reflection layer provided on the rear side thereof.

As a liquid crystal display apparatus, there are many types including an active-matrix type, a simple-matrix type and the like. For example, a liquid crystal display apparatus of the active-matrix type is comprised of: a plurality of pixel electrodes arranged in a matrix form on an internal surface of a first substrate; a plurality of active elements connected with these pixel electrodes respectively; a signal line for supplying a signal to said plurality of active elements; counter electrodes provided on an internal surface of a second substrate, disposed opposite to said plurality of pixel electrodes; and a region of a pixel in which said plurality of pixel electrodes and said counter electrodes are opposed to each other.

Further, as other types of the liquid crystal display apparatus, there are one that displays white and black pictures and another that displays color pictures. In a liquid crystal display apparatus that displays a multi-color picture, such as a full color image or the like, there are provided colored films of a plurality of colors, each having a different transmission wavelength band provided on an internal surface of its front side (first) substrate, and each corresponding to a plurality of pixels having a pixel electrode and a counter electrode disposed in opposite directions. Normally, these colored films are color filters of red, green and blue, and each color filter is formed to have the same area as that of its pixel in order to ensure that the whole light passing through the pixel and emitted as a colored light has good color purity.

However, the hybrid-type liquid crystal display apparatus having prior art filters has the problem that its display according to its reflection display mode using an external light source is very dark. This is mainly due to light absorption in the color filter. Because a color filter allows rays of light to pass in a wavelength band corresponding to the color of its color filter among visible rays of bands and absorbs rays of light in the other wavelength bands, the intensity of colored light having passed the color filter is decreased substantially in comparison with the intensity of incident light.

Further, in the case of the hybrid-type liquid crystal display apparatus, a drop in brightness of the display at the time of performing a transmission-mode display utilizing a light from a back-light; can be compensated by increasing the brightness of the back-light, however, when performing a reflection-mode display utilizing an external light, such a high brightness incident light that can compensate for the absorption of light in the color filter cannot be obtained. Further, because the incident light entering the liquid crystal display apparatus from its front side passes through the color filter twice before it is reflected on the semi-transmission reflection layer on the rear side and emitted toward the front side, its absorption of light increases further, thereby darkening the display substantially.

Therefore, there has been proposed to decreasing the absorption of light in the color filter and improving the brightness of the display by reducing the film thickness of the color filter. However, because this reduction in film thickness of the color filter causes the transmission of light in its absorption wavelength band to increase as well, a colored light having a good color purity becomes impossible to obtain, thereby resulting in a narrowed color range of color pictures to be displayed.

A hybrid-type display apparatus that improves the lightness of color (reflectance) availed in the case of a reflection display while on the other hand maintaining the color purity availed in the case of a transmission display has been proposed. FIGS. 5A and 5B show schematic diagrams of such a hybrid-type display apparatus. FIG. 5A shows a planer pattern thereof corresponding to one pixel. As shown in the drawing, a pixel PXL is divided on its plane into a transmission portion T that corresponds to a hole of a semi-transmission reflection layer and a reflection portion R that is outside the hole. Although a color filter CF is provided to cover the whole area of the transmission portion T, it covers only partially the reflection portion R. Namely, in contrast to the pixel PXL that is patterned into a rectangle, the color filter CF is patterned into a hexagon, as shown in the drawing, with the color filter CF removed partly from each corner of the reflection portion R. Thereby, while ensuring that the transmission portion T is able to obtain sufficient color purity, it is arranged for the reflection portion R to have a mixture of colored light passing through the color filter CF and non-colored light not passing therethrough so as to improve the lightness of the color.

FIG. 5B is a cross-sectional diagram of a related art cut out along the line VB-VB shown in FIG. 5A. On an internal surface of a front side substrate 1, there is formed the color filter CF patterned into a hexagon. On an internal surface of a rear side substrate 2, there is formed a reflection layer 8 of semi-transmission type having a hole H. Between both the substrates 1 and 2, there is retained a liquid crystal layer 3 as an electro-optical layer. A portion corresponding to the hole H of the semi-transmission reflection layer 8 becomes the transmission portion T of the pixel and the other portions become the reflection portion R. As to the transmission portion T, an incident light from the back light and through the rear side substrate 2 passes the color filter CF once and arrives at an observer positioned in front of the front side substrate 1. As to the reflection portion R, an incident light entering from the observer side is reflected on the reflection layer 8 and is directed toward the observer again. At this time, a part of the incident light passes a cutout portion devoid of the color filter CF, is reflected on the reflection layer 8, and then passes a portion where the color filter CF is positioned. At this time, because its external light is caused to pass through the color filter CF only once in the same manner as in the case of the backlight, the absorption is weakened, thereby improving the lightness of the color and ensuring a preferred reflectance is obtained.

However, there is the problem associated with the prior art that when patterning the color filter CF into a hexagon as shown in the drawing, because of the difference from the rectangular boundary of the pixel PXL, a cutout portion of the color filter CF may be identified sometimes as a pixel defect. Further, the irregular patterning of the color filter CF, such as into a hexagon, also involves a the problem of increasing the proportion of defective patterning.

SUMMARY OF THE INVENTION

It is therefore an object of the present invention to solve the problems associated with the prior art and to provide an improved hybrid-display apparatus.

In order to solve the above-mentioned problem associated with the prior art, the following measures have been taken. Namely, the display apparatus according to the present invention is comprised basically of: a pair of substrates, a first substrate on a front side and a second substrate on a rear side, disposed in opposite directions from each other; a first electrode provided on an internal surface of the first substrate; a second electrode provided on an internal surface of the second substrate; a color filter provided on the second substrate on the rear side and aligned with a pixel that is defined between the above-mentioned first electrode and the above-mentioned second electrode disposed in opposite directions; an electro-optical layer interposed between the above-mentioned pair of substrates; and a reflection layer provided on the second substrate on the rear side. Here, the above-mentioned reflection layer has a hole provided for each pixel, which divides a plane of each pixel into a transmission portion, which is within the hole, and a reflection portion, which is outside the hole. The above-mentioned color filter is comprised of a lamination of a colored layer and a transparent layer. As features according to the present invention, the above-mentioned colored layer is formed to be thinner in the reflection portion than in the transmission portion, and the above-mentioned transparent layer is formed to cover a difference in level of the colored layer caused between the transmission portion and the reflection portion.

Preferably, a thickness of the above-mentioned transparent layer is set at an optimum value such that an optical density of the colored layer is adjusted between the transmission portion and the reflection portion. According to a preferred embodiment of the present invention, the above-mentioned transparent layer is comprised of a transparent resin film that is formed in an internal surface of the first substrate on the front side, and the colored layer is comprised of a colored film that is formed so as to overlap the transparent resin film. According to another preferred embodiment of the present invention, the above-mentioned transparent layer is formed by selectively etching the internal surface of the front side substrate, which is transparent, and the colored layer is provided by a colored film that is formed on the internal surface that is etched as described above. Preferably, the above-mentioned electro-optical layer is comprised of a liquid crystal layer having a birefringence property, and its thickness is set twofold in the transmission portion than in the reflection portion. Preferably, the above-mentioned first electrode is a common electrode formed in common across pixels, and the above-mentioned second electrode is a pixel electrode that is isolated for each pixel, and on the second substrate there is formed an active element for driving its pixel electrode.

In the hybrid type display apparatus according to the present invention, in the process of forming the color filter, its transparent layer is formed only in its reflection portion, and then its colored layer is formed thereon. Thereby, it can reduce the thickness of the colored layer in the reflection portion than in the transmission portion by a thickness of the transparent layer that is included therein. Therefore, absorption in the color filter in the reflection portion is reduced, and lightness of color is substantially improved and its reflectance is increased. On the other hand, as for the transmission portion, because its colored layer is ensured to have a sufficient thickness, it enables a preferred color purity (optical density) to be obtained. By optimization of a film thickness of the transparent layer, it becomes possible, without impairing the color purity of the transmission type, to specify a reflectance and color purity of the reflection type at a preferred value. The colored layer itself of the color filter can be patterned in alignment with its pixel thereby causing no deformation, no pixel defect or the like to occur.

BRIEF DESCRIPTION OF THE DRAWINGS

Other features and advantages of the invention will be apparent from the following description taken in connection with the accompanying drawings, wherein:

FIG. 4 is a schematic diagram illustrative of operation of the display apparatus of the present invention as shown in FIG. 3.

PREFERRED EMBODIMENT OF THE INVENTION

Figure 1A:
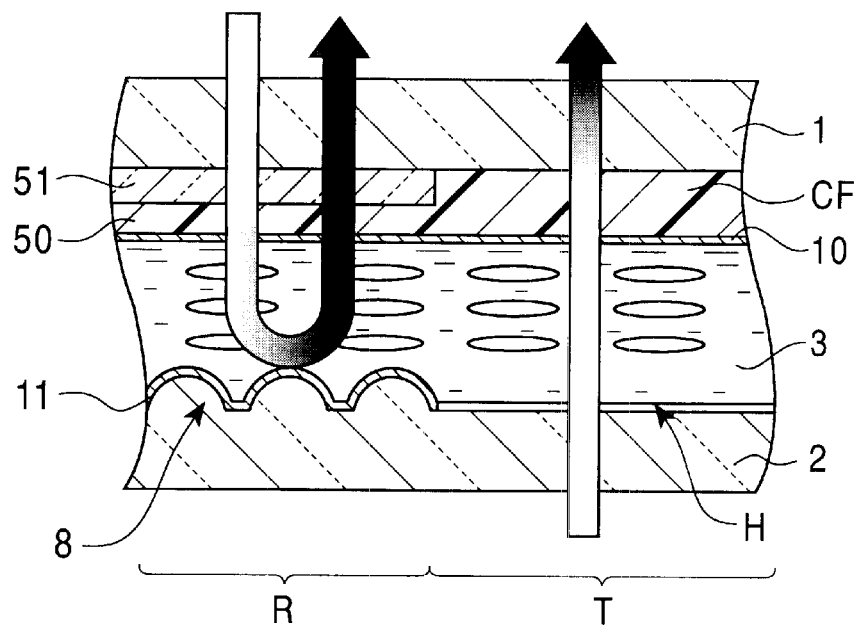
FIGS. 1A and 1B are schematic diagrams in cross-section and plan views indicative of a fundamental construction of a display apparatus according to the present invention.
Figure 1B:
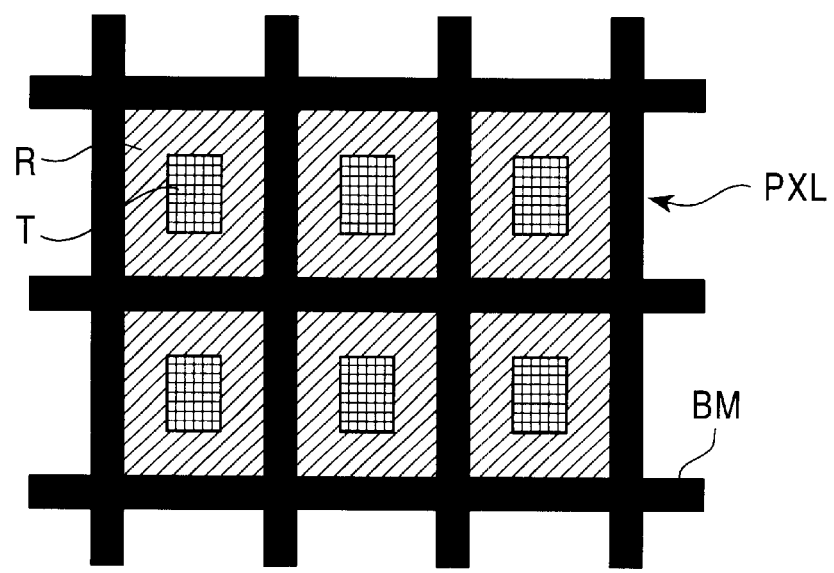

With reference to the accompanying drawings, a preferred embodiment of the present invention will be described in detail in the following. FIGS. 1A and 1B are schematic diagrams showing an example of a fundamental construction of a hybrid type display apparatus according to the present invention. FIG. 1A shows a cross-sectional construction corresponding to one pixel. As shown in the figure, this display apparatus is comprised of a pair of substrates, a first substrate 1 and a second substrate 2, which are made of glass, for example, and disposed in opposite directions from each. On an internal surface of the first substrate 1 there is formed a first electrode 10, which is made of ITO, for example, also on an internal surface of the second substrate 2 there is formed a second electrode 11, which is, for example, made of Ag and ITO. In a portion in which the first electrode 10 and the second electrode 11 are opposed from each other, there is formed a pixel. In alignment with this pixel, there is provided a color filter CF, which is comprised of a photoresist dispersed, for example, with pigment, on the first substrate 1 on the front side. Between the pair of the first substrate 1 and the second substrate 2, there is interposed, for example, a liquid crystal layer 3 as an electro-optical layer. This liquid crystal layer 3 is comprised, for example, of a guest-host liquid crystal, which interrupts an incident light to pass or allows it to pass therethrough for every pixel, in response to a voltage applied across the electrodes 10 and 11. By way of example, the present invention is not limited to using of the liquid crystal, but any other electro-optical materials may be used as well within the scope of the invention. Further, the present invention is not limited to using of the guest-host liquid crystal, but any other modes of liquid crystals may be used as well. On the second substrate 2, there is provided a reflection layer 8. This reflection layer 8 has a hole that is provided for each pixel, which divides a plane of each pixel into a transmission portion T which is within the hole and a reflection portion R which is outside the hole. According to this embodiment, the reflection layer 8 is comprised of a metal film made of Ag, for example, which is formed on an irregular surface of the second substrate 2, and serves also as the above-mentioned second electrode 11. Further, a transparent electric conductive film such as ITO is formed in the transmission portion T, which constitutes the above-mentioned hole and also serves as the second electrode 11. As clearly understood from the above description, the electrode 11 according to the present invention is comprised of a hybrid construction of the metal film provided in the reflection portion R and the transparent electric conductive film provided in the transmission portion T.

According to features of the present invention, the color filter CF is comprised of a lamination of a colored layer 50 and a transparent layer 51. The colored layer 50 is formed so as to be thinner in the reflection portion R than in the transmission portion T. In particular, in this embodiment, a thickness of the colored layer 50 in the transmission portion T is 3 $\mu$m, and a thickness of the colored layer 50 in the reflection portion R is 1 $\mu$m. In view of a difference in an optical path therebetween, thereby, a ratio of their film thicknesses is preferably more than 2. Further, the transparent layer 51 is formed so as to cover a difference in level of the colored layer 50 caused between the transmission portion T and the reflection portion R. More specifically, the transparent layer 51 is comprised of a transparent resin film formed on an internal surface of the first substrate 1, and the colored layer 50 is comprised of a colored film which is formed so as to overlap the transparent resin film. A thickness of the transparent layer 51 is set at an optimum value such that an optical density of the colored layer 50 is adjusted between the transmission portion T and the reflection portion R. For example, a thickness of the transparent layer 51 in this embodiment is 2 $\mu$m. As described above, in the hybrid type display apparatus according to the present invention, the transparent resin film such as an acrylic resin is selectively formed only in the reflection portion R by means of photolithography or the like, then the colored layer 50 is laminated thereon also by photolithography or the like. In the transmission portion T, because an incident light (from back light) is allowed to pass once through the color filter CF that has a sufficient normal thickness, a preferred color reproduction capability is realized. In the reflection portion R, because an incident light (external light) is allowed to pass twice back-and-forth through the color filter CF, the optical density of which is reduced by inclusion of the transparent resin film, a preferred color reproduction capability is also realized. In this instance, because of a reduced thickness of the colored layer 50 in the reflection portion R, the external light, even when it passes the color filter CF twice, is not subjected to an excessive absorption, and can maintain a high reflectance, thereby ensuring a brightness of display to be maintained at a level suitable for actual application. Through adjustment of the film thickness of the transparent layer 51, because it becomes possible that its reflectance, color purity and lightness of color are freely adjusted as for the reflection type display without impairing the color purity as for the transmission type display, it is enabled for each of the transmission portion T and the reflection portion R freely to design its optical density appropriately. In this embodiment, after forming the transparent layer 51, the colored layer 50 is deposited thereon. However, this order of film forming may be reversed with the same effect.

FIG. 1B is a schematic diagram indicating a planar pattern of the display apparatus according to the present invention. As shown in the figure, each pixel PXL is partitioned by a black matrix BM, which is made of Ti, for example, into a lattice pattern. Each pixel PXL, which is divided on its plane into the transmission portion T in a center area and the reflection portion R in a peripheral area, has a so-called hybrid construction. The color filter is patterned approximately corresponding to the pixel PXL that is partitioned by the black matrix BM. Because there is no need of patterning of the color filter into the irregular shape as in the conventional art, such a defect as de-coloring can be avoided from being recognized by the observer. Further, in patterning of the color filter by means of photolithography and etching, deformation or defect is not likely to occur. Further, in this embodiment, a ratio of areas between the transmission portion T and the reflection portion R is approximately one to four. However, this ratio may vary depending on a film thickness of the colored layer 51 in each portion.

Figure 2:
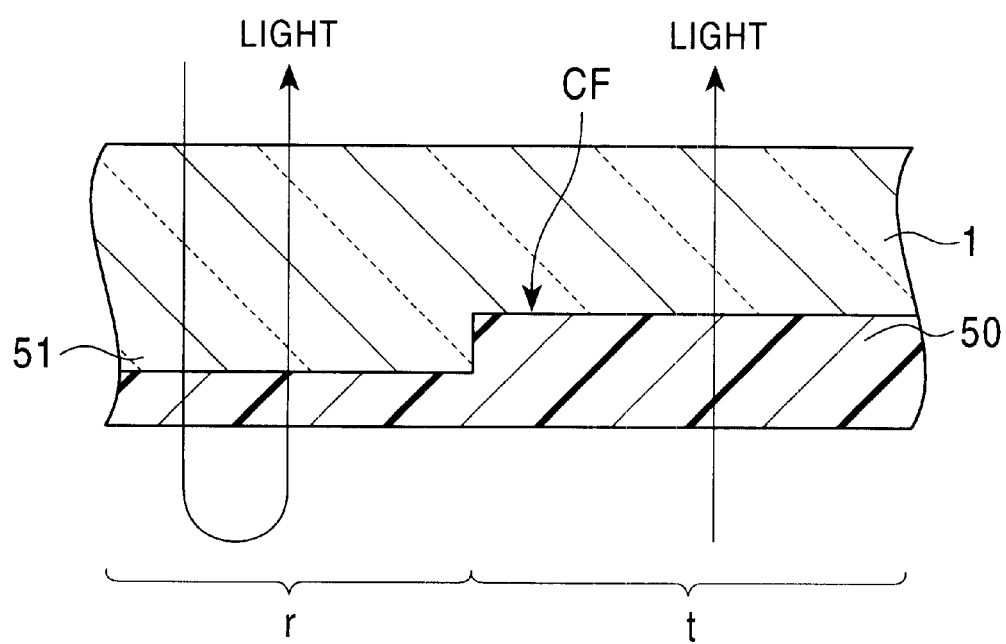
FIG. 2 is a schematic diagram in cross-section of a preferred embodiment of a color filter according to the present invention.

FIG. 2 is a schematic cross-sectional diagram of a modification of the color filter indicated in FIG. 1. The color filter CF, which is colored in a different color for each pixel, is formed on the substrate 1. In its plane within each pixel, the color filter CF is divided into a light transmission region t through which light passes once and a light reflection region r through which the light passes twice as it is reflected therein. The color filter CF has a lamination structure in which the colored layer 50 and the transparent layer 51 are laminated. According to this embodiment, the transparent layer 51 is formed by selectively etching a transparent surface of the substrate 1, and the colored layer 50 is formed as a colored film on the etched surface of the substrate 1. For example, the substrate 1 is made of glass, and by selectively etching the light transmission region t using hydrofluoric acid, the transparent layer 51 can be provided in the light reflection region r.

Figure 3:
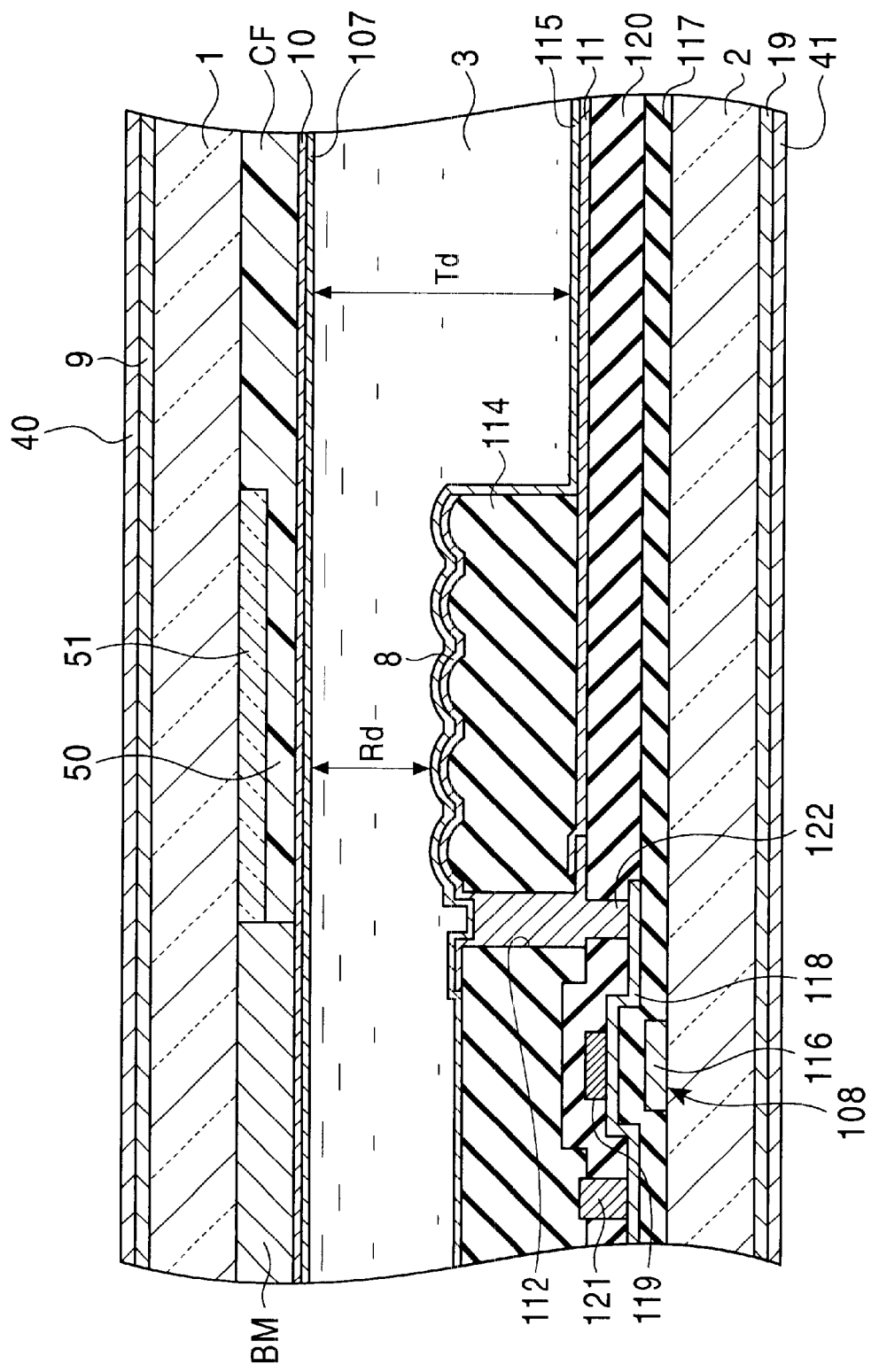
FIG. 3 is a schematic diagram in cross-section in a part of a preferred embodiment of the display apparatus according to the present invention.
Figure 5A:
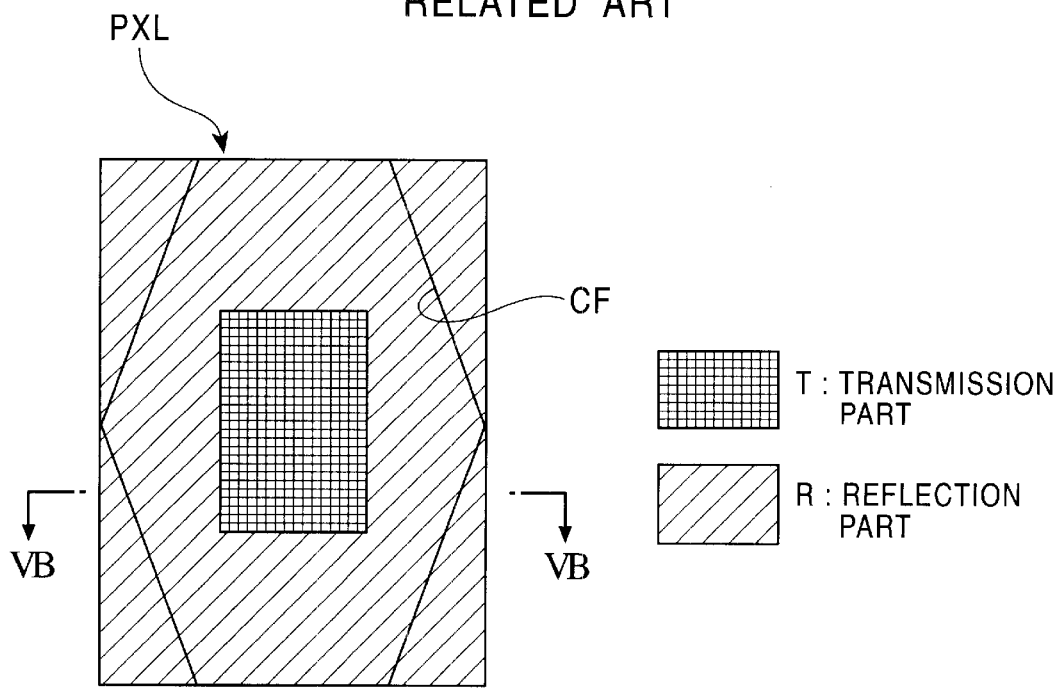
FIGS. 5A and 5B are schematic diagrams indicative of an example of related art display apparatus.
Figure 5B:
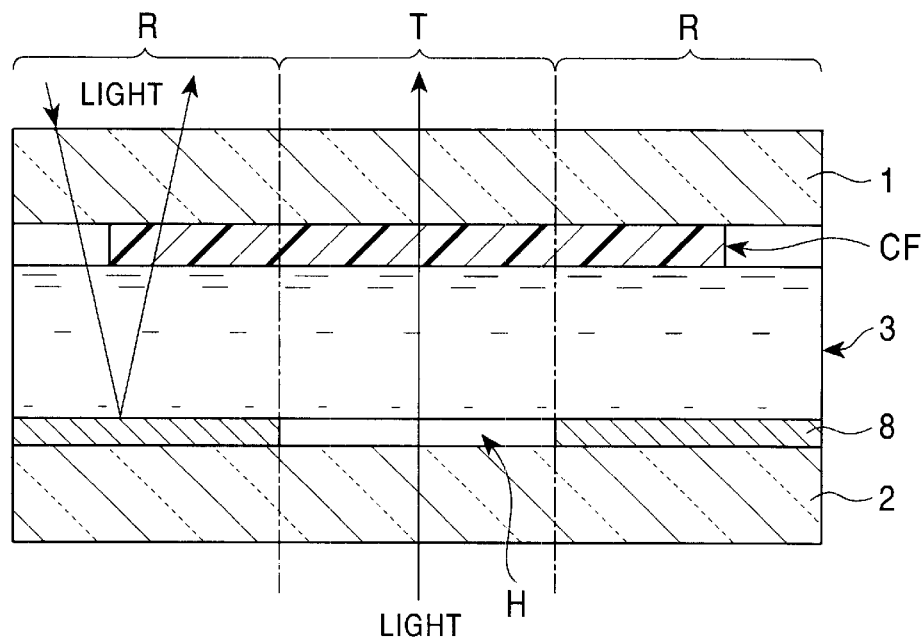

FIG. 3 is a partial cross-sectional view schematically showing a preferred embodiment of the display apparatus according to the present invention, and shows only one pixel portion. This preferred embodiment is an active matrix type, and utilizes a liquid crystal panel of electrically controlled birefringence (ECB) mode. Namely, this is a system for controlling transmission and interruption of an incident light by making use of the birefringence property of the liquid crystal. By way of example, a thin film transistor (TFT) is used as an active element for driving the pixel of active matrix type.

As shown in FIG. 3, on an external surface of a front side substrate 1, there are laminated a polarizing plate 40 and a quarter wave plate 9. On an internal surface of the substrate 1, there is formed a color filter CF by lamination of a colored layer 50 and a transparent layer 51 according to the present invention. A black matrix BM is formed by sputtering or the like also on the internal surface of the substrate 1 so as to partition the color filter CF with regard to each pixel. On surfaces of the color filter CF and the black matrix BM, there is formed, by sputtering or the like, a common electrode 10, which is made of ITO, for example, and disposed across the pixels. Upon the common electrode 10, there is formed, by off-set printing or the like, an orientation film 107, which is made of polyimide, for example. Further, a liquid crystal layer 3 having a birefringence property is interposed, and then beneath the same there is disposed a rear side substrate 2. A surface of the substrate 2 is covered by an orientation film 115 made of polyimide, for example, which in collaboration with an orientation film 107 on the front side substrate 1, causes the liquid crystal layer 3 to be orientated, for example, in a horizontal direction. As indicated in FIG. 3, a thickness Td of the liquid crystal layer 3 in the transmission portion is set twofold of a thickness Rd thereof in the reflection portion. More specifically, the thickness Td corresponds to one half of a wavelength of incident light, and the thickness Rd corresponds to a quarter of the wavelength of the incident light. Beneath the orientation film 115, there is formed a pixel electrode 11 by sputtering or the like. This pixel electrode 11 is comprised of a transparent conductive film such as ITO, and forms a hole in the transmission portion. Overlapping this transparent pixel electrode 11 in part and via an insulation film 114, a reflection layer 8 is formed by sputtering. The reflection layer 8 is comprised of a metal film such as Ag formed on an irregular surface of the insulation film 114, which is comprised of an organic resin film, for example, and is connected to the same potential as that of the above-mentioned pixel electrode 11. Therefore, the reflection layer 8 also constitutes a part of the pixel electrode 11. In the lower direction of the pixel electrode 11, a thin film transistor 108 is formed. This thin film transistor 108 has a bottom gate arrangement, and has a lamination structure of: sequentially from the bottom to the upper directions, a gate electrode 116 made of Mo-Ta, for example; a gate isolation film 117 made of $SiO_2$, for example; and a semiconductor thin film 118. The semiconductor thin film 118 is made of, for example, polycrystalline silicon, which is subjected to laser-recrystallization, and its channel region, which is aligned with the gate electrode 116, is protected by a stopper 119, which is made of $SiO_2$, for example, in the upper direction. The thin film transistor 108 having a bottom gate structure as described above is covered by an interlayer isolation film 120 which is made of $SiO_2$, for example. The interlayer isolation film 120 has a pair of contact holes, through which a source electrode 121 and a drain electrode 122 are electrically connected with the thin film transistor 108. These electrodes 121 and 122 are made by patterning aluminum, for example. The drain electrode 122 is connected with the above-mentioned pixel electrode 11. Further, through the contact hole 112 formed in the isolation film 114, the reflection layer 8 is also electrically connected to the drain electrode 122. On the other hand, a signal voltage is supplied to the source electrode 121. Finally, on a rear surface of the rear side substrate 2, a quarter wave plate 19 and a polarizing plate 41 are laminated.

FIG. 4 is a schematic diagram illustrative of operation of the display apparatus of the invention shown in FIG. 3, and, in particular, it illustrates the structure of the reflection portion thereof. The right-hand side depicts an off-state of applied voltage, in which light transmits. On the other hand, the left-hand side depicts an on-state of applied voltage, in which light is interrupted. This reflection type display apparatus is made up, in the order from the above, by lamination of: a polarizing plate 40; a quarter wave plate 9; a front side substrate 1; a color filter CF; a common electrode 10; a liquid crystal layer 3 having birefringence; a reflection layer 8 that also serves as a pixel electrode; and a rear side substrate 2. In the off-state, liquid crystal molecules 4 are orientated in a horizontal direction, and thus the liquid crystal layer 3 functions as a quarter wave plate. In the on-state, the liquid crystal molecules 4 shift to a vertical orientation, and thus the liquid crystal layer 3 loses the function as the quarter wave plate. In other words, in the off-state, because the liquid crystal layer 3 that functions as a quarter wave plate and a quarter wave plate 9 are overlapped, they function in combination as a half wave plate. In the case of the reflection type, because an incident light makes a round trip in the panel before it is emitted as a light of reflection, the panel functions in effect as full wave plate. Because full wave plate transmits incident light and emits as it is, consequently, a linearly polarized incident light passing through the polarizing plate 40 reaches the observer as a linearly polarized emergent light as it is, thereby ensuring a light transmission state to be realized. On the other hand, in the on-state, because the liquid crystal layer 3 loses the function as a quarter wave plate, only the quarter wave plate 9 remains to function. In the reflection type, because an incident light makes a round trip through a quarter wave plate 9, the panel functions in effect as a half wave plate. A half wave plate rotates a linearly polarized incident light by 90° to make it a linearly polarized emergent light. Therefore, the linearly polarized incident light when passing through the polarizing plate 40 is rotated by 90° to become a linearly polarized emergent light and thus to be absorbed by the polarizing plate 40. Thereby, a light cut-off state is obtained. By way of example, operation in the transmission portion is substantially the same as in the reflection portion described above. The transmission portion has a structure in its bottom portion which is as if in a mirror relation with its upper portion with respect to a boundary of the reflection layer 8, virtually drawn extending along the reflection layer 8. Namely, in the structure thereof, a thickness of the liquid crystal layer 3 becomes twofold of a thickness of the reflection portion, and on a rear surface of the rear side substrate 2, there are added a quarter wave plate 19 and a polarizing plate 41 (see FIG. 3). Further, a thickness of the color filter CF therein becomes approximately twofold in comparison with that in the reflection portion (see FIG. 3). Further, each color filter CF of each color of RGB used in this embodiment of the invention has the same thickness. However, it is not limited thereto, and each film thickness of the colored layer 50 and the transparent layer 51 may be varied optimally for each of RGB.

As described heretofore, in the hybrid mode display apparatus according to the invention, it becomes possible to provide for the transmission portion having high color purity and the reflection portion having a high reflectance at the same time with full compatibility ensured therebetween. Further, because of no need of patterning its color filter into irregular shapes within the pixel, defects such as de-coloring associated with the prior art will not be recognized by the observer. In addition, when patterning its color filter by photolithography, deformation or defect in patterns is not likely to occur. Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A display apparatus comprising:
   a pair of substrates comprising a first substrate on a front side and a second substrate on a rear side, disposed in opposite directions from each other;
   a first electrode provided in an internal surface of said first substrate;
   a second electrode provided in an internal surface of said second substrate;
   a color filter provided on said first substrate, and aligned with a pixel formed in a portion in which said first and said second electrodes oppose to each other;
   an electro-optical layer disposed between said pair of substrates; and
   a reflection layer provided on an internal surface of said second substrate, wherein:
   said reflection layer includes a hole provided for each pixel, thereby dividing each pixel in its plane into a light transmission portion which is within the hole and a light reflection portion which is outside the hole; and
   said color filter comprises a lamination of a colored layer and a transparent layer, wherein:
   said colored layer is formed thinner in said reflection portion than in said transmission portion, and said transparent layer is formed so as to cover a difference in level of said colored layer caused between the transmission portion and the reflection portion.

2. The display apparatus according to claim 1, wherein the thickness of said transparent layer is set optimally so that the optical density of said colored layer is adjusted between the transmission portion and the reflection portion.

3. The display apparatus according to claim 1, wherein said transparent layer comprises a transparent resin film formed in an internal surface of said first substrate, and said colored layer comprises a colored film formed so as to overlap said transparent resin film.

4. The display apparatus according to claim 1, wherein said transparent layer is formed by a selective etching of a transparent internal surface of said first substrate, and said colored layer comprises a colored film that is formed on the internal surface thereof that is etched.

5. The display apparatus according to claim 1, wherein said electro-optical layer comprises a liquid crystal layer that has a birefringence property, and a thickness of which is set twofold in the transmission portion than in the reflection portion.

6. A display apparatus according to claim 1, wherein:
   said first electrode is a common electrode that is formed in common across pixels,
   said second electrode is a pixel electrode that is isolated for each pixel, and
   an active element is formed on said second substrate for driving the pixel electrode.

7. A method of manufacturing a display apparatus which comprises: a pair of substrates comprising a first substrate on a front side and a second substrate on a rear side, disposed in opposite directions from each other; a first electrode provided in an internal surface of said first substrate; a second electrode provided in an internal surface of said second substrate; a color filter provided on said first substrate, aligned with a pixel formed in a portion in which said first and said second electrodes oppose to each other; an electro-optical layer disposed between said first and said second substrates; and a reflection layer provided on the second substrate, said method comprising the steps of:
   forming said colored layer to be thinner in said reflection portion than in said transmission portion; and
   forming said transparent layer so as to cover a difference in level of the colored layer caused between the transmission portion and the reflection portion.

8. The method of manufacturing the display apparatus according to claim 7, comprising the step of:
   setting a thickness of said transparent layer at an optimal value such that an optical density of said colored layer is adjusted between the transmission portion and the reflection portion.

9. The method of manufacturing the display apparatus according to claim 7, comprising the steps of:
   using for said transparent layer a transparent resin film formed on an internal surface of said first substrate; and
   using for said colored layer a colored film that is formed so as to overlap said transparent resin film.

10. The method of manufacturing the display apparatus according to claim 7, comprising the steps of:
    forming said transparent layer by a selective etching of a transparent internal surface of said first substrate; and
    providing said colored layer by forming a colored film on said transparent internal surface that is etched.

11. The method of manufacturing the display apparatus according to claim 7, comprising the steps of: using for said electro-optical layer a liquid crystal layer having a birefringence property; and setting a thickness of said liquid crystal layer to be twofold in the transmission portion of a thickness thereof in the reflection portion.

12. The method of manufacturing the display apparatus according to claim 7, comprising the steps of:
    providing said first electrode as a common electrode which is formed in common across pixels;
    providing said second electrode as a pixel electrode which is isolated for each pixel; and
    forming an active element on said second substrate for driving said pixel electrode.

13. A color filter which is formed on a substrate, as colored differently for each pixel, said each pixel being divided, in its plane, into a light transmission region through which a light passes once and a light reflection region through which a light passes twice as an incident light once then as a reflected light, having a lamination structure of a colored layer and a transparent layer, wherein
    said colored layer is formed to be thinner in said light reflection region than in said light transmission region; and
    said transparent layer is formed such as to cover a difference in level of said colored layer caused between the light transmission portion and the light reflection portion.

14. The color filter according to claim 13, wherein a thickness of said transparent layer is set optimally so that an optical density of said colored layer is adjusted between the light transmission region and the light reflection region.

15. The color filter according to claim 13, wherein said transparent layer comprises a transparent resin film formed on a surface of said substrate, and said colored layer comprises a colored film formed so as to overlap said transparent film.

16. The color filter according to claim 13, wherein said transparent layer is formed by selectively etching a surface of said substrate, which is transparent, and said colored layer is a colored film formed on the surface of said substrate which is etched.

* * * * *